United States Patent
Mowery et al.

[11] Patent Number: 5,959,387
[45] Date of Patent: Sep. 28, 1999

[54] METHOD FOR WINDING A FIELD ASSEMBLY FOR A UNIVERSAL MOTOR AND APPARATUS PRODUCED THEREBY

[75] Inventors: John Mowery, Florissant; James I. Metzger, Jr., Ballwin, both of Mo.

[73] Assignee: Emerson Electric Co., St. Louis, Mo.

[21] Appl. No.: 08/927,060

[22] Filed: Sep. 10, 1997

[51] Int. Cl.⁶ .................................................. H02K 1/00
[52] U.S. Cl. ........................ 310/198; 310/179; 310/254; 310/208; 310/210; 310/216
[58] Field of Search .................................. 310/198, 254, 310/208, 210, 179, 216

[56] References Cited

U.S. PATENT DOCUMENTS

| | | | |
|---|---|---|---|
| 5,449,962 | 9/1995 | Shichijyo et al. | 310/184 |
| 5,486,731 | 1/1996 | Masaki et al. | 310/180 |
| 5,541,463 | 7/1996 | Ellzey | 310/261 |
| 5,793,133 | 8/1998 | Shiraki et al. | 310/81 |

*Primary Examiner*—Nestor Ramirez
*Assistant Examiner*—Thanh Lam
*Attorney, Agent, or Firm*—Arnold, White & Durkee

[57] ABSTRACT

A method for winding a field assembly for a universal motor and apparatus produced thereby is disclosed. The method involves winding both a field winding and a brake winding over different field poles within a field core simultaneously. After the first field winding and the first brake winding are wound, the field core is indexed to allow a second brake winding to be wound over the first field winding, and a second field winding to be wound over the first brake winding. By using the disclosed method, a field assembly is produced in which both field windings and the brake windings are wound using one continuous wire for each. Moreover, the presented method can be performed on a single winding machine.

22 Claims, 13 Drawing Sheets

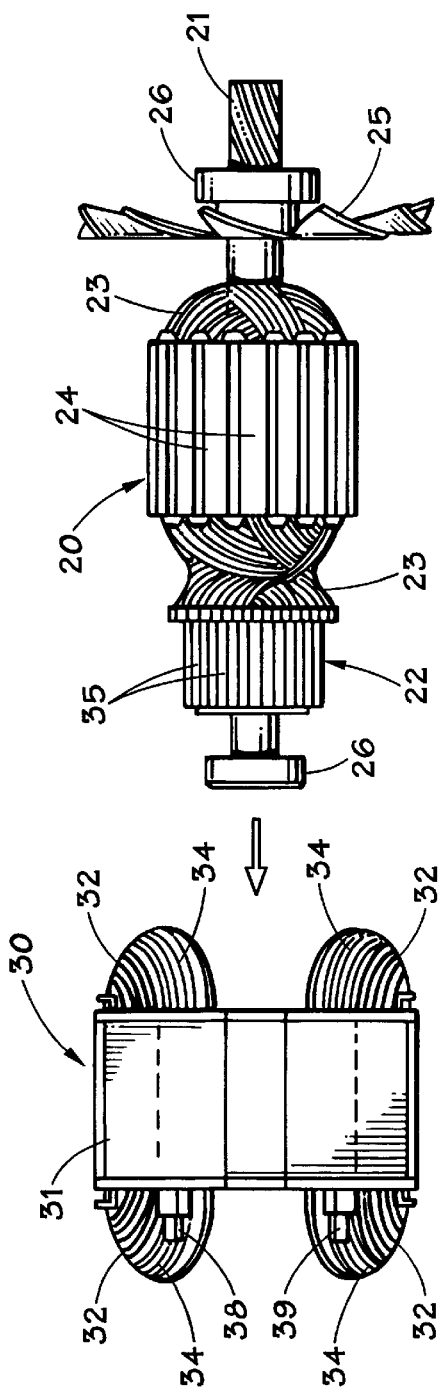
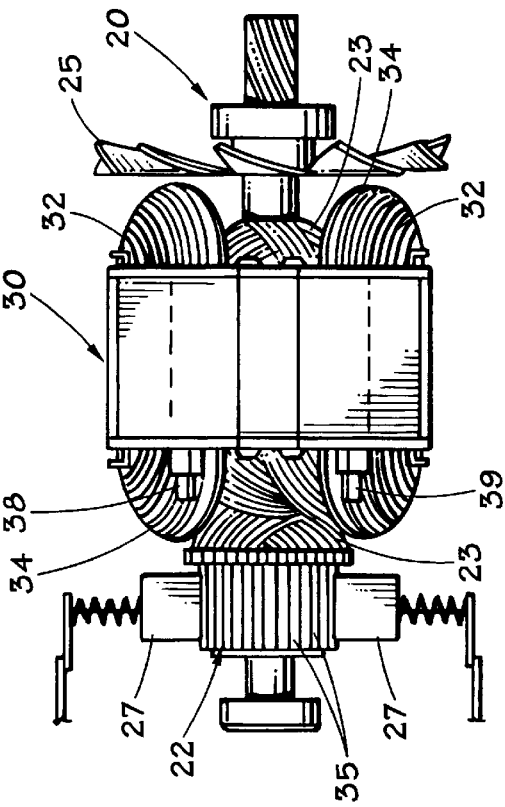
FIG. 1A (PRIOR ART)
FIG. 1B (PRIOR ART)

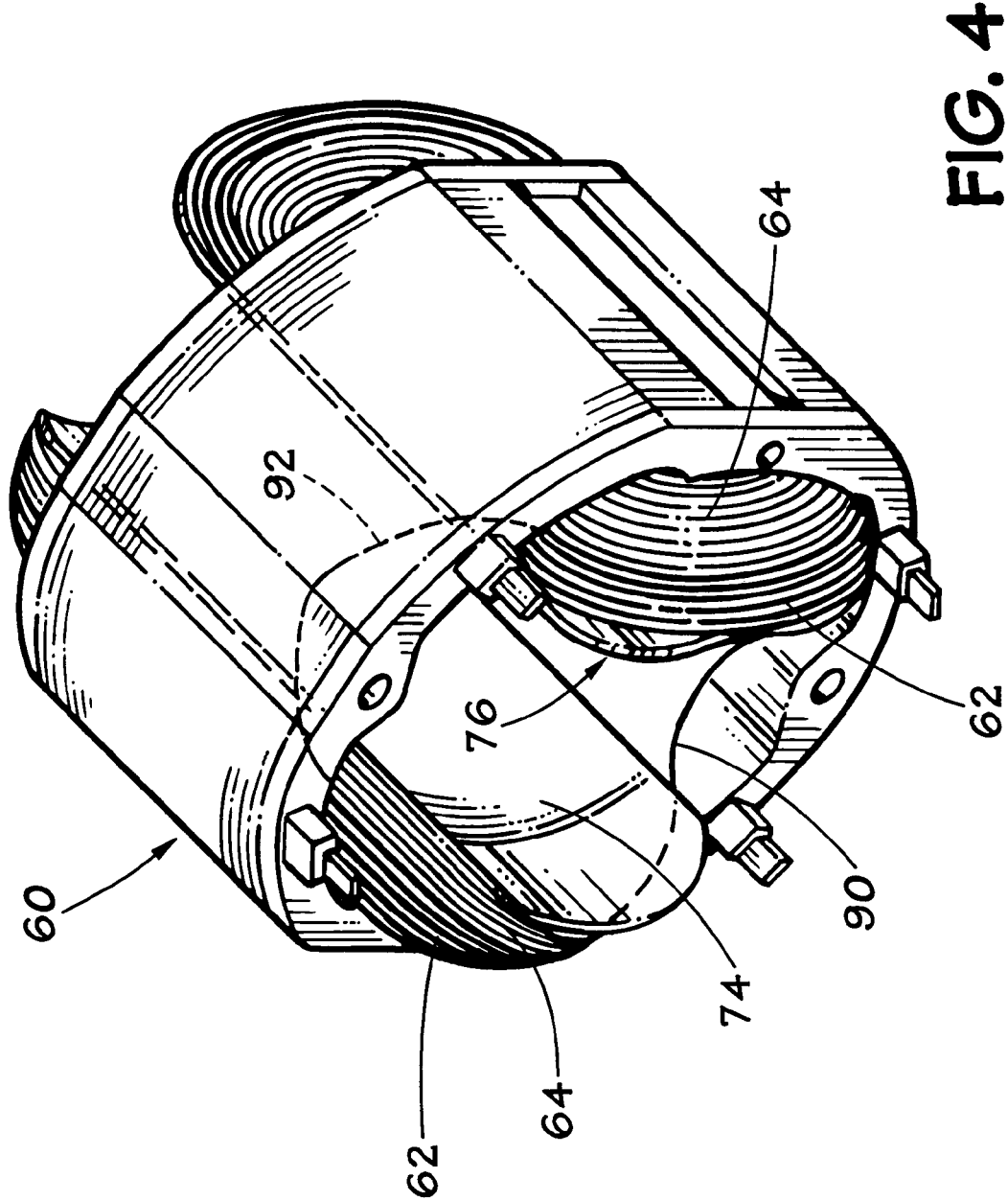

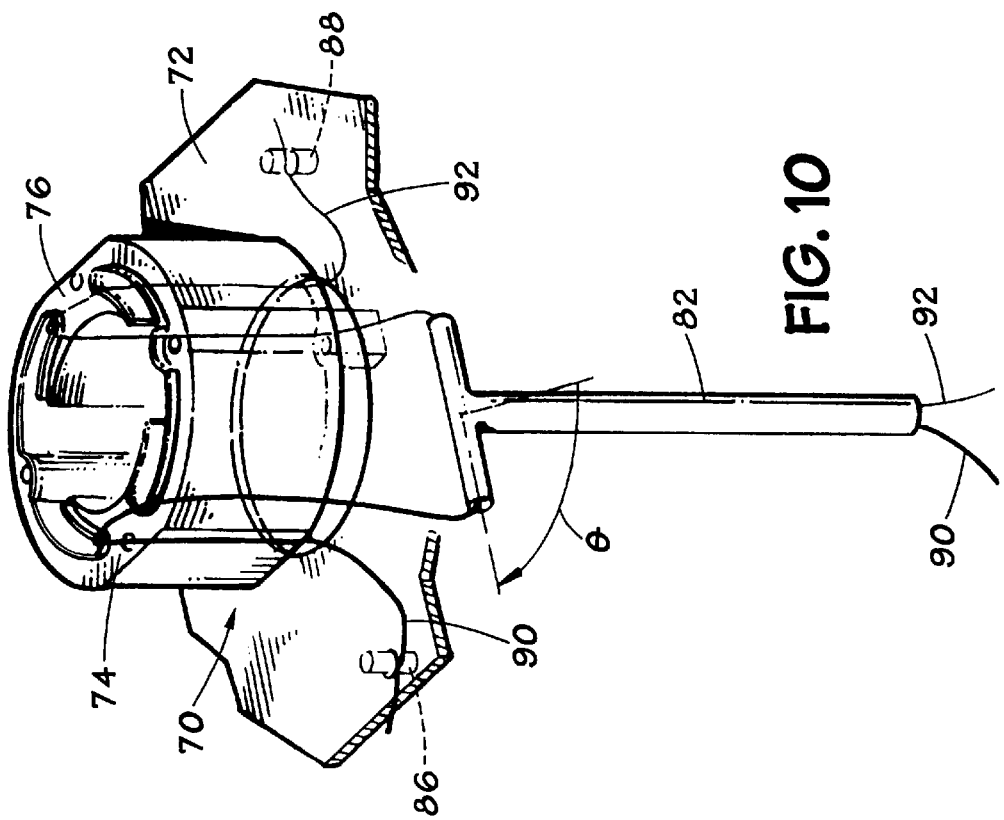
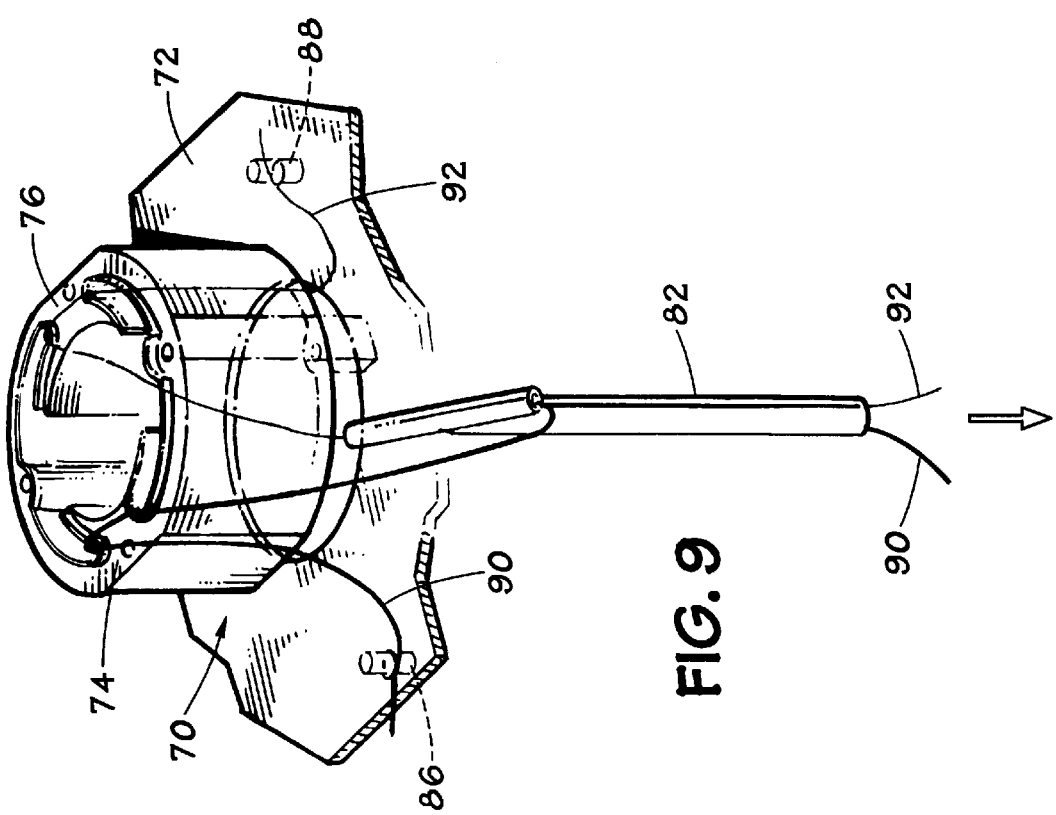

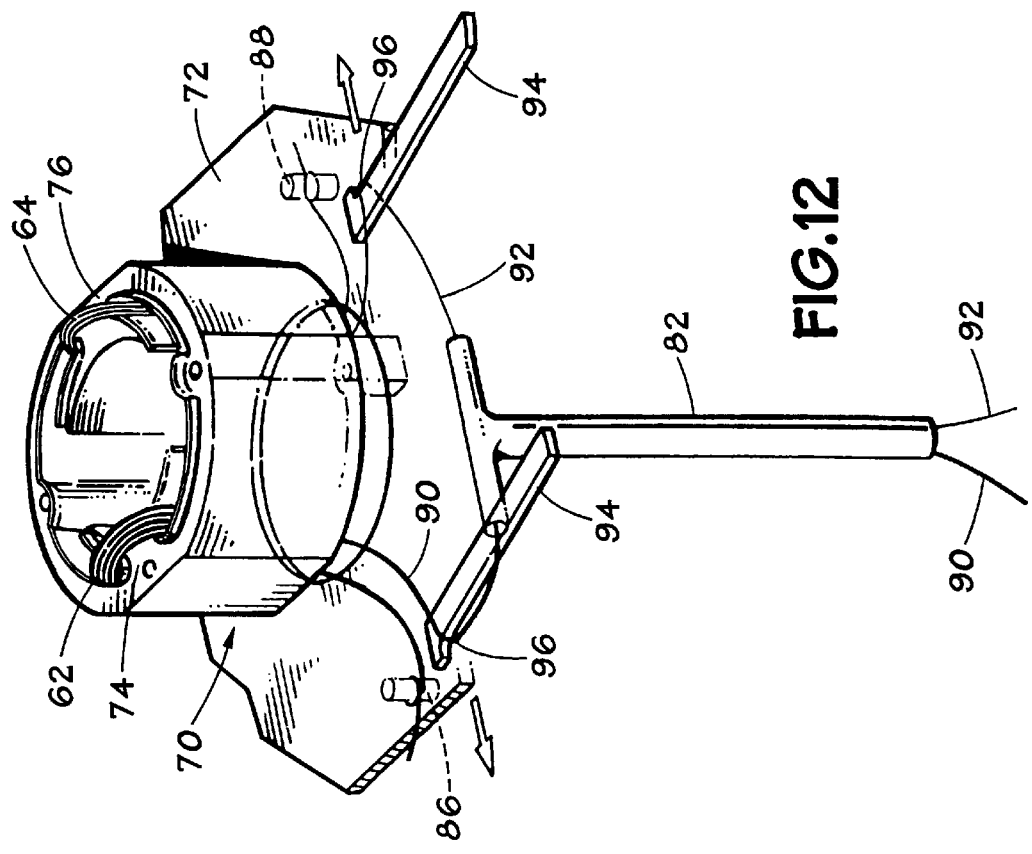
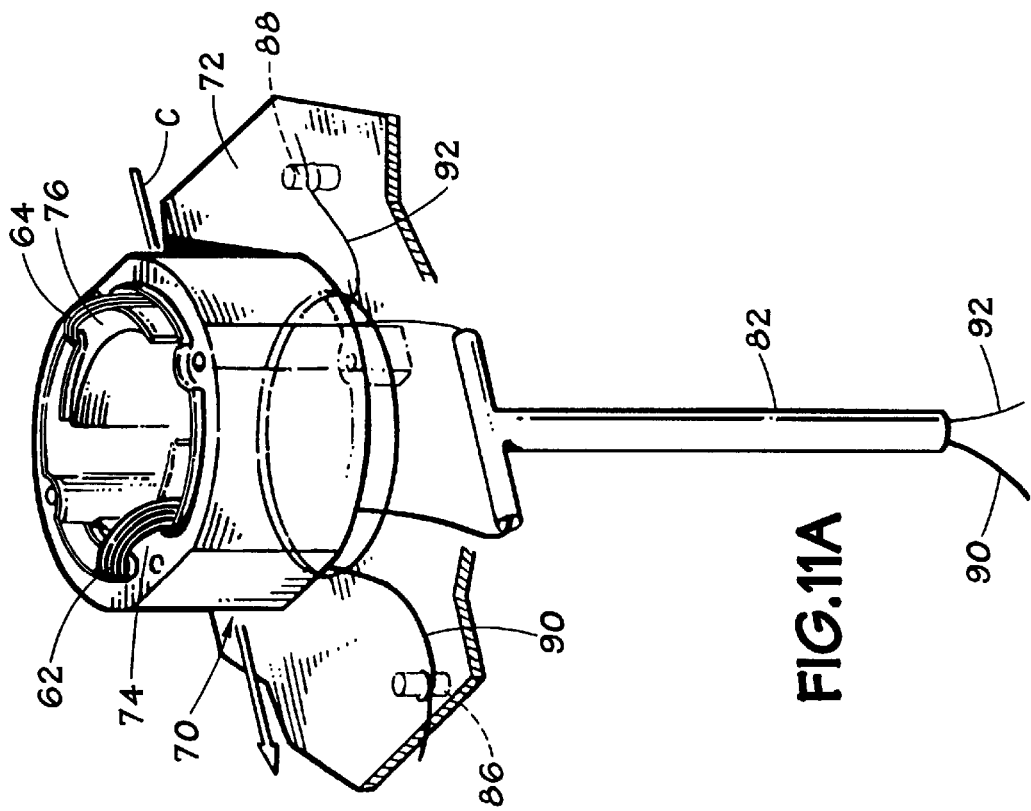

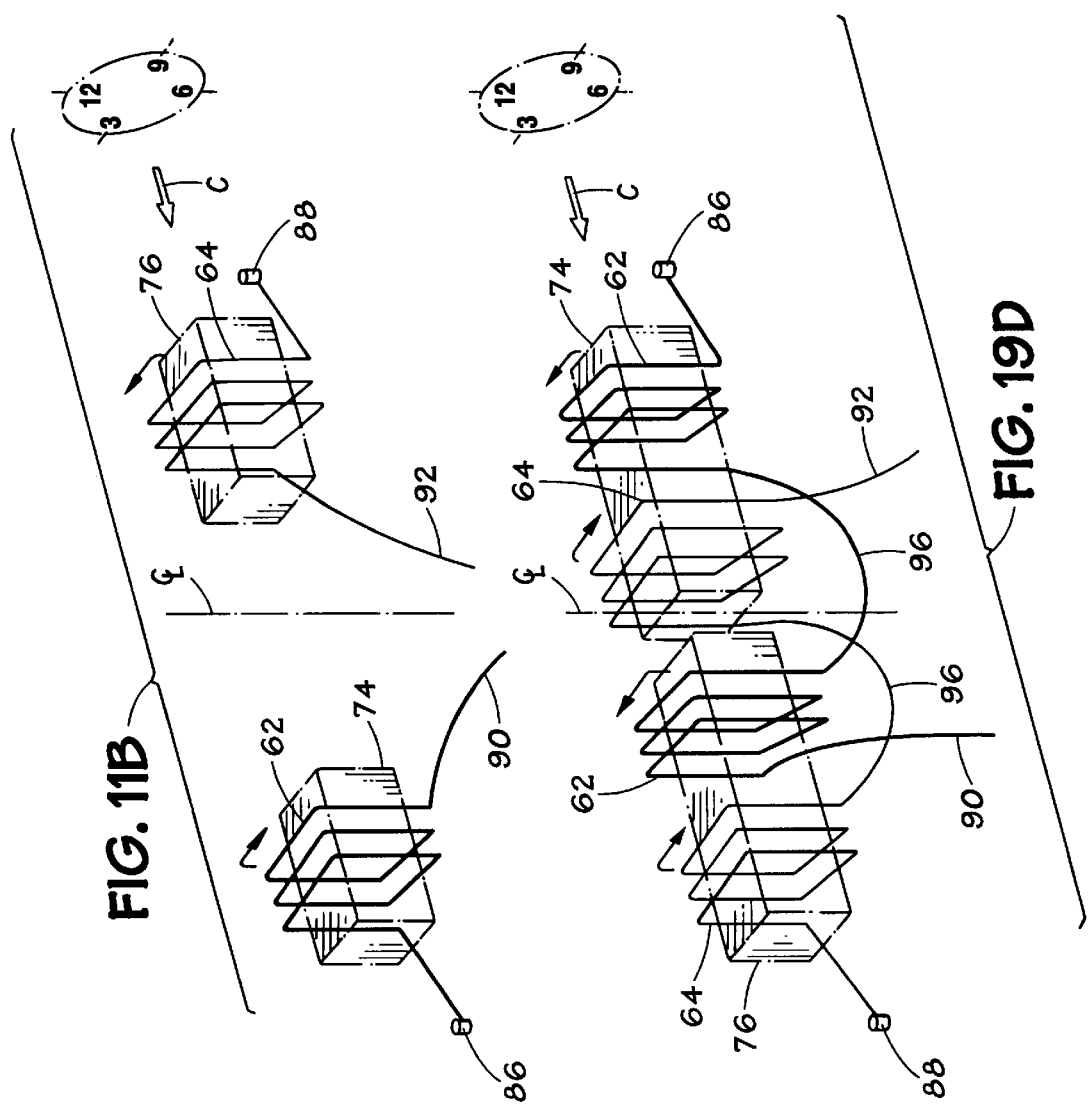

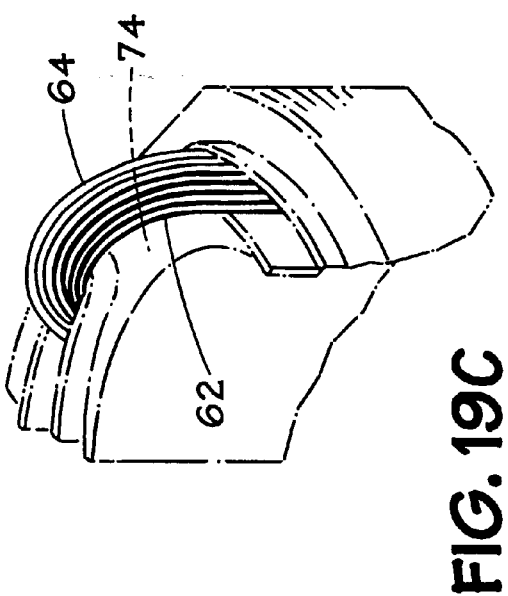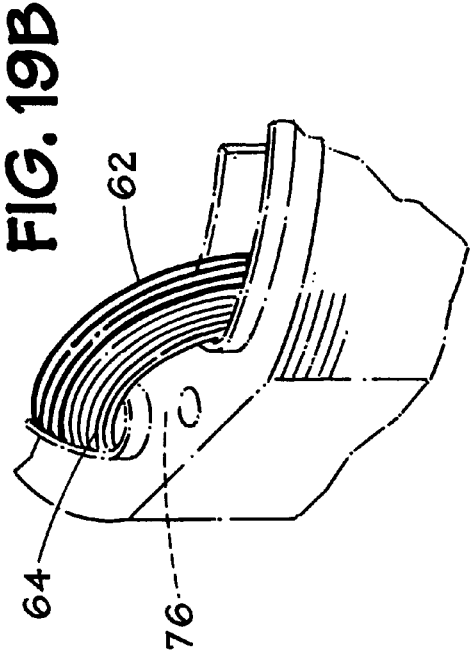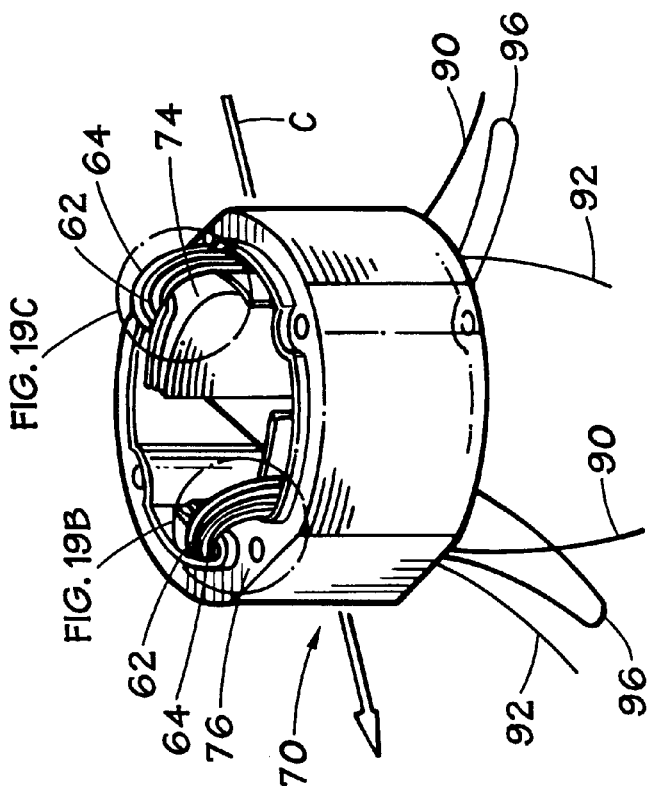

METHOD FOR WINDING A FIELD ASSEMBLY FOR A UNIVERSAL MOTOR AND APPARATUS PRODUCED THEREBY

BACKGROUND OF THE INVENTION

This invention relates generally to universal motors, and more specifically to a method for winding a field assembly for a universal motor having brake windings and an apparatus produced thereby.

Universal motors (i.e., those capable of being powered by either direct current (DC) or alternating current (AC)) have been widely used in home appliances and industrial machines for many years. FIGS. 1A and 1B show a conventional universal motor usable, for example, in a miter saw. The universal motor is comprised of two main components: the field assembly 30 and the armature 20. The armature 20 comprises: a shaft 21; a commutator 22 including several commutator bars or contacts 35; a plurality of armature windings 23; an armature core including a plurality of armature poles 24 over which the armature windings 23 are wound; a fan 25; and bearings 26. The field assembly 30 comprises: a field core 31; field windings 32; brake windings 34; field poles 36 (not visible) over which the field windings 32 and the brake windings 34 are wound; two connector tabs 38 connected to the end leads of the field windings 32 (only one is shown); and two connector tabs 39 connected to the end leads of the brake windings 34 (only one shown). The connector tabs comprise a portion of the terminal boards which are affixed to the two flat ends of the field core 31. Also shown in FIG. 1B are the brushes 27 which contact the bars 35 on the commutator 22 to energize the armatures windings 23. When the armature windings 23 and the field windings 32 are energized by the application of current to the brushes 27 and the connector tabs 38 respectively, the armature 20 turns inside of the field assembly 30.

FIG. 2 shows a circuit diagram of the conventional universal motor of FIG. 1A and 1B. The windings are connected such that, when the motor is engaged by connecting the switch 37 to terminal A, the field windings 32 and the armature windings 23 are connected in series and current passes through them. The current flowing through the field windings 32 causes a north magnetic pole and a south magnetic pole to form on the two poles 36 over which the field windings 32 are wound (see FIG. 3), thus creating a substantially parallel magnetic field between the two poles 36. The brushes 27 and the commutator 22 route this current through the armature windings 23, causing another magnetic field to form around the armature 20. Because the armature windings 23 are wound in a manner to create a magnetic field which is approximately 90 degrees from the magnetic field produced by the field windings 32, the two fields will attempt to align, and the armature 20 will turn inside of the field assembly 30. However, when the armature 20 is turned, a new set of bars 35 on the commutator 22 are energized, and a new approximately 90 degree magnetic field is established by the armature windings 23 in the armature 20. In this way, the armature 20 will continually spin within the field assembly 30 when energized.

Also shown in the circuit of FIG. 2 are the brake windings 34. The brake windings 34 are used to quickly slow or "brake" the motor when power to the field windings 32 has been disengaged. Specifically, when the power to the field windings 32 is disengaged by moving the tap of the switch 37 to terminal B, the field windings 32 and the armature windings 23 are disconnected, which causes the armature 20 to "coast" to a stop. In addition, connecting the switch 37 to terminal B routes the brake windings 34 in series with the armature windings 23. Residual magnetism in the field core from the previously energized field windings 32 causes the still spinning (i.e. "coasting") armature 20 to generate a small current through the brake windings 34 and the armature windings 23. Because the brake windings 34 are now energized by the small current, they too will create a magnetic field. However, because the brake windings 34 are wound in the opposite direction of the field windings 32, the magnetic field produced by the brake windings 34 will be opposite of the field previously formed by the field windings 32. The small current provides positive "feedback" which increases the magnetic field produced by the brake windings 32, thus producing an even higher current, and so on, until the current becomes limited by the resistance of the brake windings 34 and the armature windings 23. In this way, the mechanical energy of the spinning armature 20 is extracted through the brake winding 34/armature winding 23 circuit, thus quickly braking the motor. By designing the brake windings 34 to have an appropriate resistance, the rate at which the motor brakes can be well controlled, with the extracted mechanical energy being dissipated as heat in the brake windings 34/armature winding 23 circuit. The operation of universal motors is well known to one of ordinary skill, and the reader is directed to the "Standard Handbook for Electrical Engineers," 10th Edition, McGraw-Hill Book Company, Section 7, Section 18 (paragraphs 1, 125 and 127), and Section 21 (paragraphs 211 and 212) (1969), which is incorporated by reference herein in its entirety.

FIGS. 3A–3C show the field assembly 30 in more detail (with the armature 20 removed for clarity). As previously noted, the field windings 32 and the brake windings 34 are wound around each field pole 36 of the field assembly 30. Traditionally, these windings 32 and 34 are wound in two steps and on two separate winding machines. Typically, the field winding 32 is wound first using a first machine. Then the partially wound field assembly 30 is transferred to a second machine which winds the brake windings 34 over the field windings 32. It is also known to wind the field windings over the brake windings. This conventional practice requires two machines, involves additional labor to transfer the partially wound field assembly 30 between machines, and results in a field assembly 30 with eight leads: two leads for each of the field windings 32, and two leads for each of the brake windings 34. A field winding lead on the first pole needs to be spliced together with the field winding lead on the second pole (referred to as "crossover connections" 41) to connect the two field windings 32 in series (the brake windings 34 are similarly connected). FIG. 3A shows the crossover connection 41 for the field windings 32 which appears between the two poles 36 (the crossover connection 41 for the brake windings 34 appears on the opposite side of the field assembly 30 and is seen in phantom in FIG. 3A). The windings 32 and 34 can be connected at the crossover connections 41 by solder or by "crimping," but other means of making a connection are suitable. However, connecting the crossover connections 41 adds to the number of steps required to assemble the field assembly 30, further increasing production costs. Additionally, the crossover connections 38 occasionally fail, hampering the reliability of the finished motor product.

Another way of braking the motor is to use two pole switches so that the field windings and the brake windings are both connected in a generator mode during braking. Such an approach is used in commercially available miter saws such as the Sears/Craftsman™ 10-inch Compound Miter Saw, Model No. 113.234600, sold by Sears Roebuck & Co., Chicago, Ill. 60684. The Owner's Manual of this miter saw product shows a circuit diagram of this arrangement (pg. 23), which is incorporated by reference herein in its entirety. This arrangement requires the use of two normally-open contacts and two normally-closed contacts which, during braking, reverse the connections of the field winding and connects the reversed field windings in series with both the brake windings and the armature windings (so that the resistance of the field winding may be used to assist in braking the motor). While such an approach has been shown to produce adequate braking characteristics, it requires a complicated arrangement of components within the motor.

The present invention improves on these prior art practices by disclosing an improved field assembly winding method and field assemblies produced thereby.

SUMMARY OF THE INVENTION

In a first aspect of the invention, a field assembly for a universal motor is disclosed which includes: a field core; a plurality of field poles connected to the field core, including at least a first field pole and a second field pole; a first winding wound around the first field pole, the first winding comprising a first wire; a second winding wound over the first winding on the first field pole, the second winding comprising a second wire; a third winding wound around the second field pole, the third winding comprising the second wire; and a fourth winding wound over the third winding on the second field pole, the fourth winding comprising the first wire.

In another aspect of the invention, a field assembly for a universal motor is disclosed which includes: a field core; a plurality of field poles connected to the field core, including at least a first field pole and a second field pole; a first brake winding wound around the first field pole, the first brake winding comprising a first brake winding wire; a first field winding wound over the first brake winding on the first field pole, the first field winding comprising a first field winding wire; a second field winding wound around the second field pole, the second field winding comprising a second field winding wire; and a second brake winding wound over the second field winding on the second field pole, the second brake winding comprising a second brake winding wire.

In another aspect of the invention, a field assembly for a universal motor is disclosed which includes: a field core; a plurality of field poles connected to the field core; brake winding wire of a first diameter wound around at least two of the plurality of field poles to create N turns around each of the at least two field poles, where N is a positive integer greater than or equal to 1; and field winding wire of a second diameter wound around at least two of the plurality of field poles to create N turns around each of the same at least two field poles over which the brake winding wire are wound.

In another aspect of the invention, a method for winding a wire of a first diameter and a wire of a second diameter around the field poles of a field core during the construction of a field assembly usable in a universal motor is disclosed. The field core comprises a plurality of field poles and includes at least a first field pole and a second field pole, the first wire diameter being smaller than the second diameter, and the method comprises the step of simultaneously winding the wire of a first diameter around the first field pole; and winding the wire of a second diameter around the second field pole.

In another aspect of the invention, a method for winding a first wire and a second wire around a field core to construct a field assembly usable in a universal motor is disclosed. The field core comprises a plurality of field poles and includes at least a first field pole and a second field pole, and the method comprises the steps of: winding the first wire around the first field pole to form a first winding while simultaneously winding the second wire around the second field pole to form a second winding; and winding the first wire around the second field pole to form a third winding over the second winding while simultaneously winding the second wire around the first field pole to form a fourth winding over the first winding.

In another aspect of the invention, a method for winding a brake winding wire of a first diameter and a field winding wire of a second diameter around the field poles of a field core during the construction of a field assembly usable in a universal motor is disclosed. The field core comprises a plurality of field poles and includes at least a first field pole and a second field pole, and the method comprises the step of simultaneously winding the field winding wire around the first field pole to form a first field winding; and winding the brake winding wire around the second field pole to form a first brake winding.

In another aspect of the invention, a method for winding a brake winding wire and a field winding wire around a field core to construct a field assembly usable in a universal motor is disclosed. The field core comprises a plurality of field poles and includes at least a first field pole and a second field pole appearing on opposite sides of the field core, the field core having a cylindrical axis therethrough. The method comprises the steps of: winding the field winding wire around the first field pole in a clockwise fashion to form a field winding while simultaneously winding the brake winding wire around the second field pole in a counterclockwise direction to form a brake winding; indexing the field core 180 degrees around its cylindrical axis; and winding the field winding wire around the second field pole in a counterclockwise fashion while simultaneously winding the brake winding wire around the first field pole in a clockwise direction.

In another aspect of the invention, a universal motor is disclosed which includes: a field core, the field core including at least a first field pole and a second field pole; an armature disposed between the first field pole and the second field pole; means for energizing the motor to enable the armature to turn between the first and second field poles; and means for braking the motor to stop the armature from turning between the first and second field poles, wherein the means for energizing includes a first field winding and a second field winding, the means for braking includes a first brake winding and a second brake winding, and wherein the first brake winding is wound around the first field pole, the first field winding is wound around the second field pole, the second brake winding is wound over the first field winding, and the second field winding is wound over the first brake winding.

In another aspect of the invention, a field winding machine for winding a field core usable in a universal motor is disclosed. The field winding machine includes: a nest plate for securing the field core inside the field winding machine; and means for simultaneously winding a brake winding wire around the first field pole in a clockwise direction and a field winding wire around the second field pole in a counterclockwise direction.

BRIEF DESCRIPTION OF THE DRAWINGS

FIG. 1A shows the major components of a conventional universal motor, including a field assembly and an armature, and shows the field assembly and the armature separated for clarity.

FIG. 1B shows the conventional universal motor, and shows the armature positioned within the field assembly.

FIG. 4 shows an isometric view of the field assembly of the invention.

FIG. 9 shows the arrangement of FIG. 8 with the winding needle assembly lowered beneath the field core.

FIG. 10 shows the arrangement of FIG. 9 with the winding needle assembly rotated θ degrees clockwise to return the winding needle assembly to its neutral position.

FIG. 11A shows the arrangement after several iterations of the steps shown in FIGS. 6 through 10, and shows a field winding wound around a first field pole, and a brake winding wound around a second field pole.

FIG. 11B shows a diagrammatic representation of the field winding and brake winding of FIG. 11A.

FIG. 12 shows the arrangement of FIG. 11 with lead pullers pulling the winding wires outward to create loops.

FIG. 19A shows the wound field core after removal from the winding machine.

FIG. 19B shows an enlarged view of the top of the second field pole of FIG. 19A and shows the field winding wound over the brake winding.

FIG. 19C shows an enlarged view of the top of the first field pole of FIG. 19A and shows the brake winding wound over the field winding.

FIG. 19D shows a diagrammatic representation of the field windings and brake windings of FIG. 19A.

DESCRIPTION OF ILLUSTRATIVE EMBODIMENTS

Figure 2:
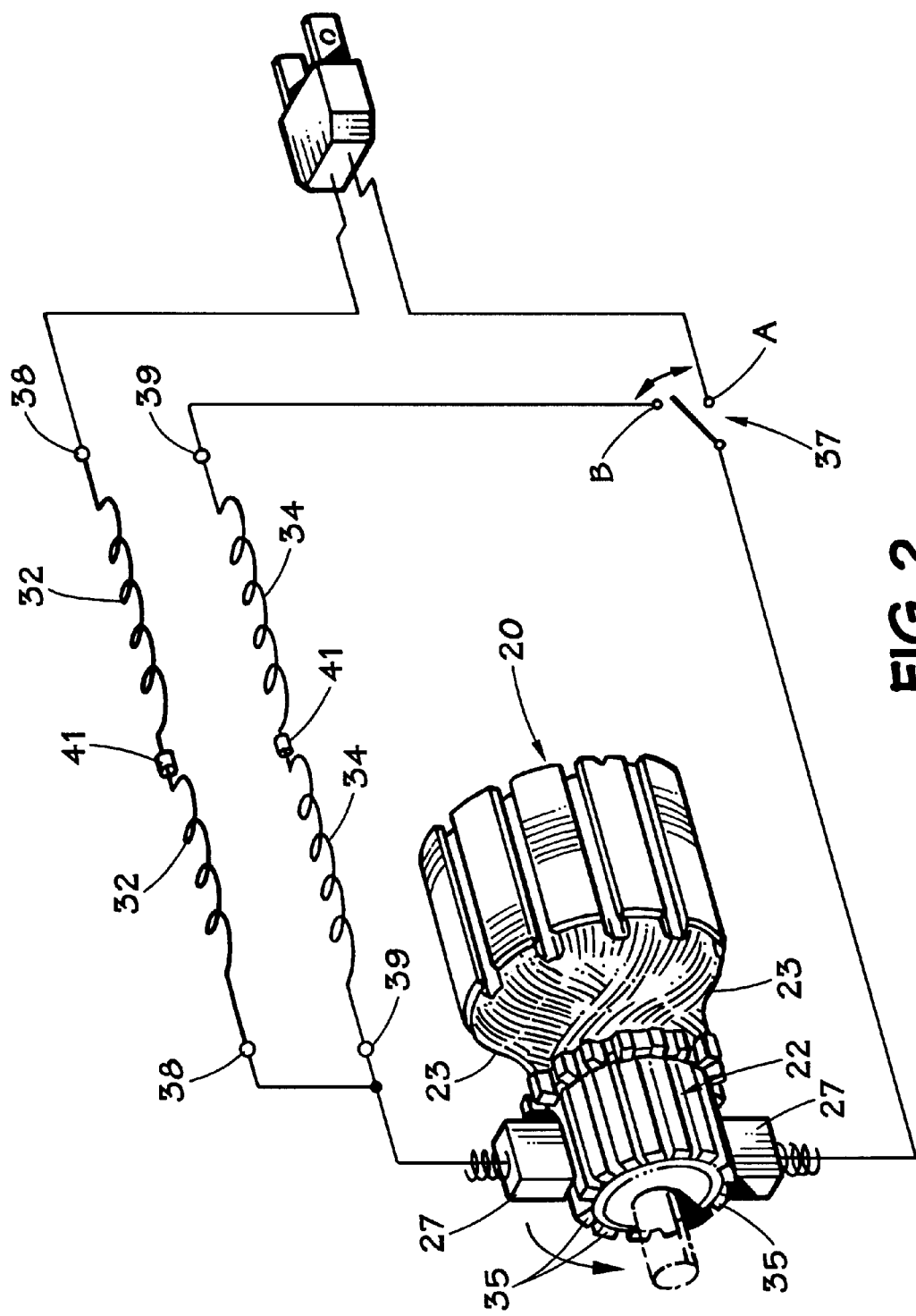
FIG. 2 shows a circuit schematic of the conventional universal motor of FIGS. 1A and 1B.
Figure 3B:
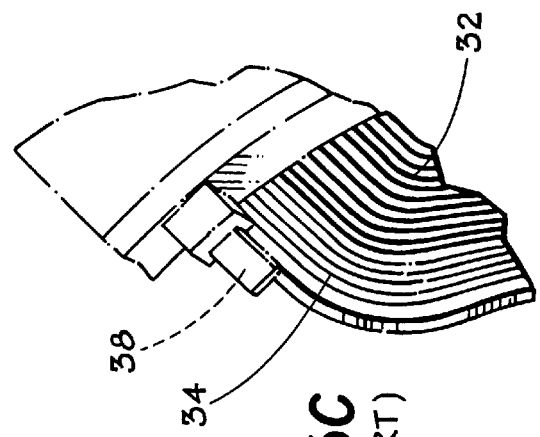
FIG. 3B shows an enlarged view of the tops of one of the poles of FIG. 3A and shows the brake winding wound over the field winding.
Figure 3C:
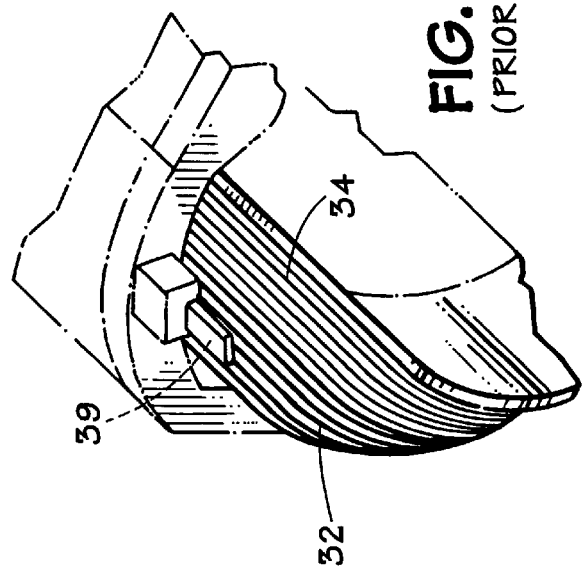
FIG. 3C shows an enlarged view of the tops of one of the poles of FIG. 3A and shows the brake winding wound over the field winding.
Figure 3A:
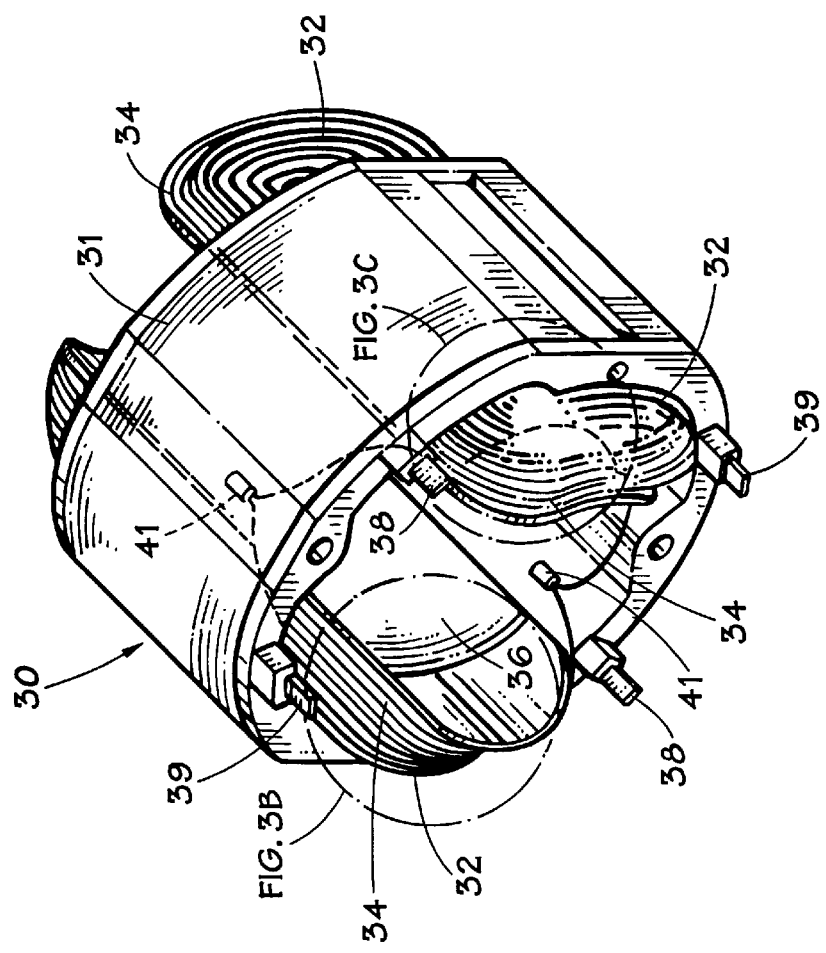
FIG. 3A shows an isometric view of the field assembly of the conventional universal motor of FIGS. 1A and 1B.

The disclosed inventive motor field assembly 60 is shown in FIG. 4. Notably, and in contrast to conventional winding schemes, the orientation of the field windings 62 and the brake windings 64 are reversed on the two field poles: the brake winding 64 is wound over the field winding 62 on the first field pole 74, and the field winding 62 is wound over the brake winding 64 on the second field pole 76. Also, the disclosed field assembly 60 does not contain crossover connections, but instead uses a continuous wire 90 to wind the field windings 62 on both the first field pole 74 and the second field pole 76 and a continuous wire 92 to wind the brake windings 64 on both poles. Furthermore, the field windings 62 and the brake windings 64 each contain the same number of turns over each of the poles 74 and 76, with the resistance of the brake winding adjusted by choosing a wire of appropriate diameter.

An improved field winding process makes the construction of such a field assembly possible. Notably, this process winds both the field windings 62 and the brake windings 64 simultaneously and on a single machine. This process is described in FIGS. 5 through 19 and the text accompanying these figures.

Figure 5:
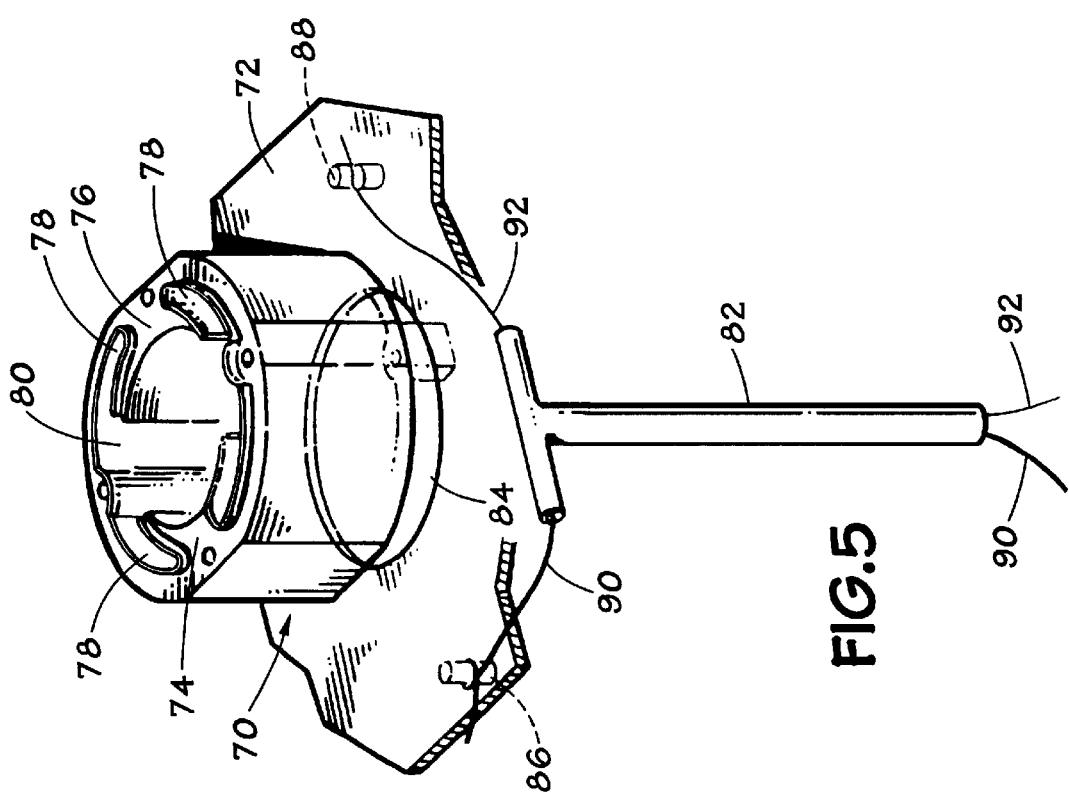
FIG. 5 shows a field core mounted in a winding machine prior to winding and shows the neutral position of a winding needle assembly.

Referring to FIG. 5, a field core 70 to be wound is secured to a nest plate 72 of a winding machine. The field core 70 contains two field poles, first field pole 74 and second field pole 76 which extend inward into the field core 70. The poles 74 and 76 are shaped to leave two slots 78 on the sides of each pole, and around which the field and brake windings will be wound. Slot insulators 80 line the slots 78 to insulate the field and brake windings from the field core 70 and the poles 74 and 76. Below the field core 70 (and below the nest plate 72 in the winding machine) is a hollow "T" shaped winding needle assembly 82 which is arranged to oscillate vertically and rotationally as will be made clear in subsequent figures. The nest plate 72 has a central hole 84 to permit the winding needle assembly 82 to pass through as it oscillates vertically. Attached to the underside of the nest plate 72 are two wire supports 86 and 88 which are used to clamp the ends of field winding wire 90 and the brake winding wire 92 respectively. As noted previously, the field winding wire 90 is of a larger diameter than the brake winding wire 92 so that the field winding and the brake winding can have the same number of turns around the poles 74 and 76 while keeping the resistance of the brake winding suitably high to facilitate braking. The wires 90 and 92 are threaded through opposite ends ("tips") of the top of the T-shaped winding needle assembly 82 and emerge together through the bottom of the "T" where they are connected to wire tensioners and to the wire spools which feed the wire during the winding process (not shown for clarity). In FIG. 5, the winding needle assembly 82 is in a neutral position in which its tips are aligned with the field poles 74 and 76.

The nest plate 72, winding needle assembly 82, and wire supports 86 and 88 comprise components within the winding machine. The winding machine comprises other structures which are fastened above and below the field core 70 to help guide the wires 90 and 92 into position and to help form the windings into the desired shape. However, these components are standard components of commercially available winding machines known to those of ordinary skill in the art and are not shown here so as not to obscure the inventive aspects of this disclosure. Also not shown in FIGS. 5 et seq. are the terminal boards which contain the connector tabs and which would be affixed to the two flat ends of the field core.

One of ordinary skill will realize that the winding methods disclosed herein and structures produced thereby can be realized without affixing the terminal boards prior to winding the field core.

Figure 6:
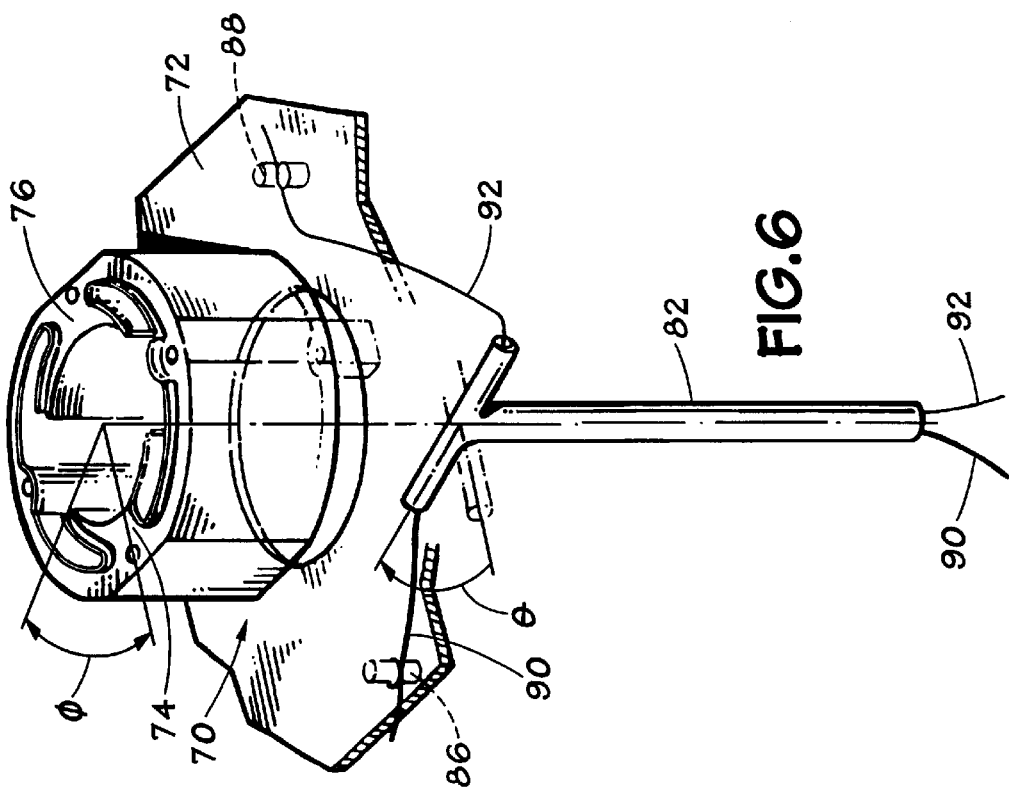
FIG. 6 shows the arrangement of FIG. 5 with the winding needle assembly rotated θ degrees clockwise.

Referring to FIG. 6, the winding needle assembly 82 is rotated θ degrees clockwise. The exact angle θ of rotation will depend on the geometry of the poles 74 and 76 to be wound. However, θ should be larger than the angle spanned by the poles 74 and 76 around the field core (i.e., angle φ as shown in FIG. 6). For example, if φ=60 degrees, θ might be about 70 degrees to ensure that the needle has cleared the poles 74 and 76, yet is suitably close to the poles for proper winding of wires 90 and 92 around them.

Figure 7:
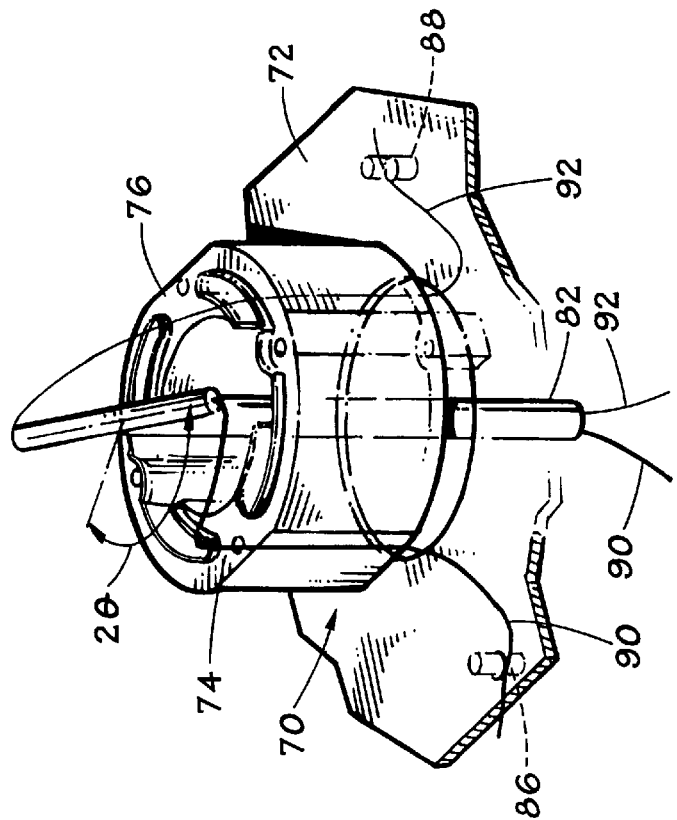
FIG. 7 shows the arrangement of FIG. 6 with the winding needle assembly placed through the field core.

Referring to FIG. 7, the winding needle assembly 82 is moved vertically upward through the space between the poles 74 and 76, carrying the field winding wire 90 and the brake winding wire 92 with it. The ends of the two wires 90 and 92 are still secured by the wire supports 86 and 88 respectively. As the winding needle assembly 82 moves upwards, wires 90 and 92 are drawn through the tensioners and are fed by the wire spools.

Figure 8:
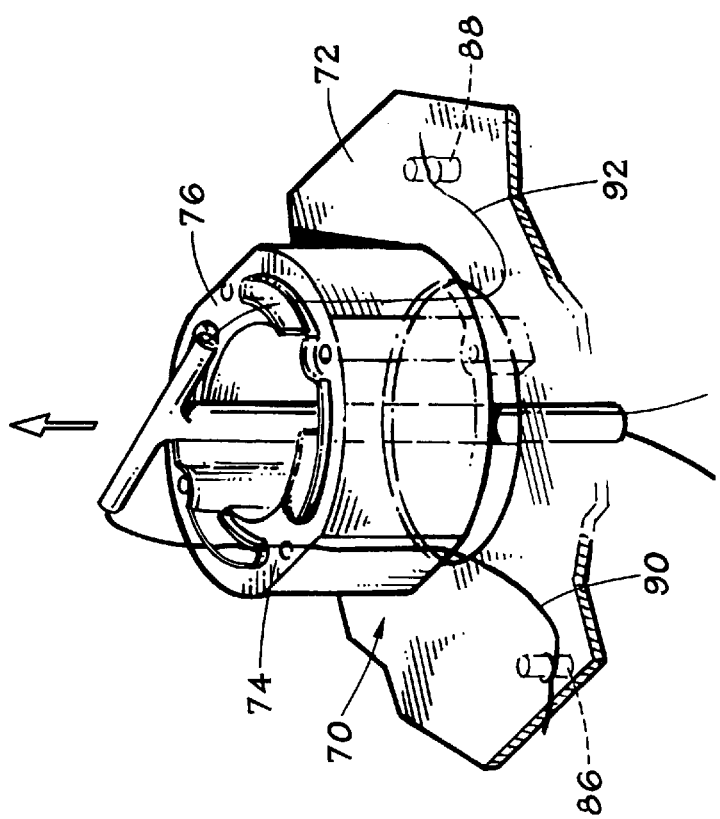
FIG. 8 shows the arrangement of FIG. 7 with the winding needle assembly rotated 2θ degrees counterclockwise.

Referring to FIG. 8, the winding needle assembly 82 is rotated 2θ degrees counterclockwise. Through this motion, the field winding wire 90 and the brake winding wire 92 are drawn over the tops of poles 74 and 76 respectively.

Referring to FIG. 9, the winding needle assembly 82 is moved downward through the spaces between the poles 74 and 76. Through this motion, the field winding wire 90 and the brake winding wire 92 span the tops of poles 74 and 76 respectively.

Referring to FIG. 10, the winding needle assembly 82 is rotated θ degrees clockwise to return it to the neutral position. At this point in the winding process, one turn of field winding wire 90 is wound around the first field pole 74 and one turn of brake winding wire 92 is wound around the second field pole 76.

Referring to FIG. 11A, the winding needle assembly 82 repeats the winding steps as described in FIGS. 6 through 10 several times, creating a field winding 62 on first field pole 74 and a brake winding 64 on second field pole 76. Both the field winding 62 and the brake winding 64 have the same number of turns, and are wound in opposite directions. Specifically, when viewed from perspective C, the field winding 62 is wound counterclockwise around the first field pole 74 and the brake winding 64 is wound clockwise around the second field pole 76. This is shown diagrammatically in FIG. 11B.

Referring to FIG. 12, two lead pullers 94 (a component of the winding machine) are moved into place below the nest plate 72 and between the wires 90 and 92 extending from the tips of the winding needle assembly 82. The lead pullers 94 are then moved outward as shown to create loops 96 in each wire.

Figure 13:
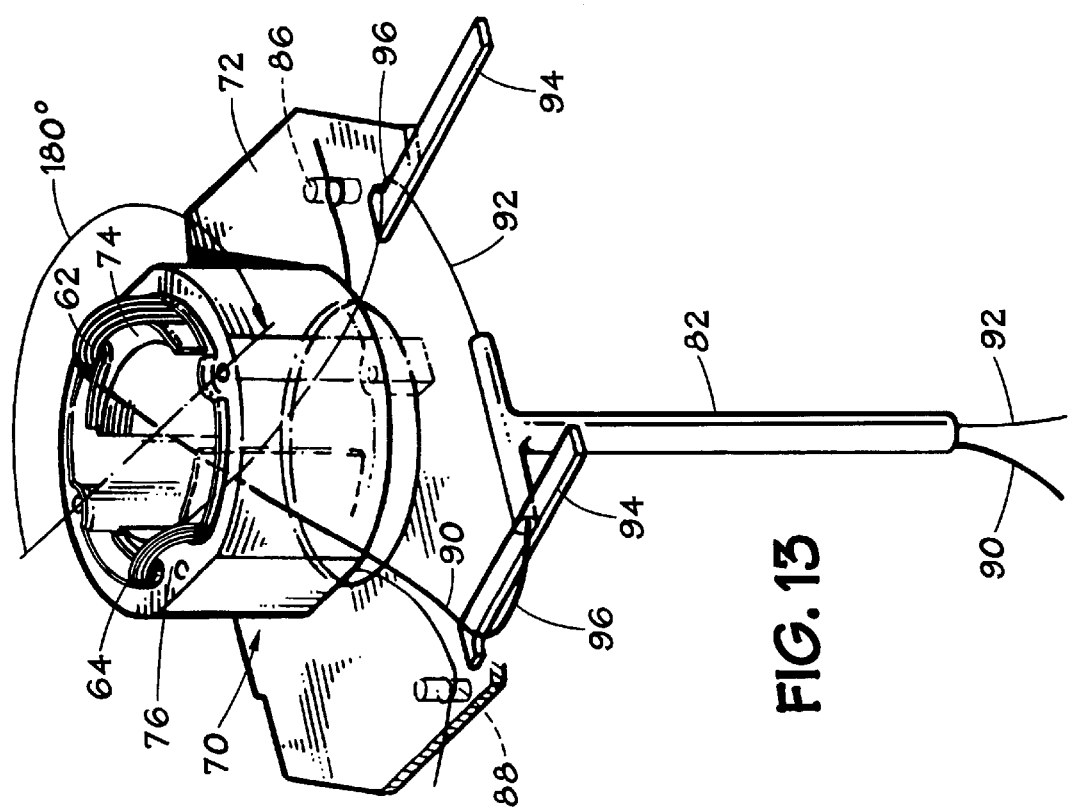
FIG. 13 shows the arrangement of FIG. 12 with the field core indexed 180 degrees relative to the winding needle assembly.

Referring to FIG. 13, the nest plate 72 is rotated or "indexed" 180 degrees clockwise around the cylindrical axis that runs through the field core 70 carrying the partly wound field core 70 and the wire supports 86 and 88 with it. However, the winding needle assembly 82 is not turned and the field winding wire 90 and the brake winding wire 92 are drawn into proximity with the opposite field pole (i.e., the field winding wire 90 is now in proximity to second field pole 76 and the brake winding wire 92 is now in proximity to first field pole 74). Additional clamps (not shown) are used to move the wires 90 and 92 away from the center of the field core 70 to prevent them from interfering with the motion of the winding needle assembly 82.

Figure 14:
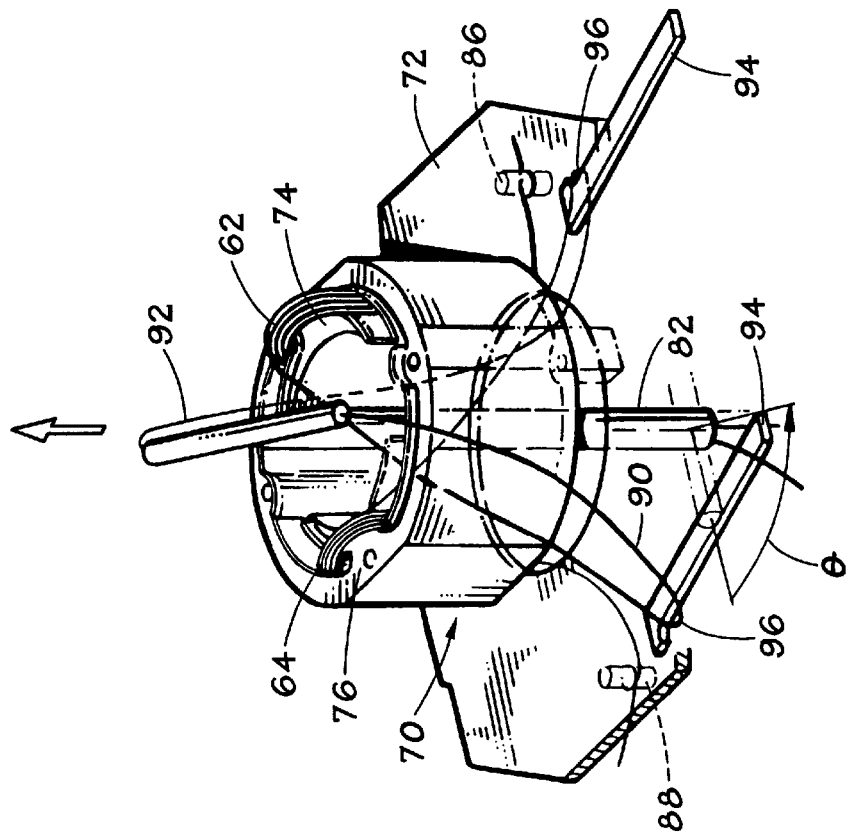
FIG. 14 shows the arrangement of FIG. 13 with the winding needle assembly rotated θ degrees counterclockwise and placed through the field core.

Referring to FIG. 14, the winding needle assembly 82 is rotated θ degrees counterclockwise (i.e., in the opposite direction as shown in FIG. 6) and is moved upward through the field core 70 as in FIG. 7.

Figure 16:
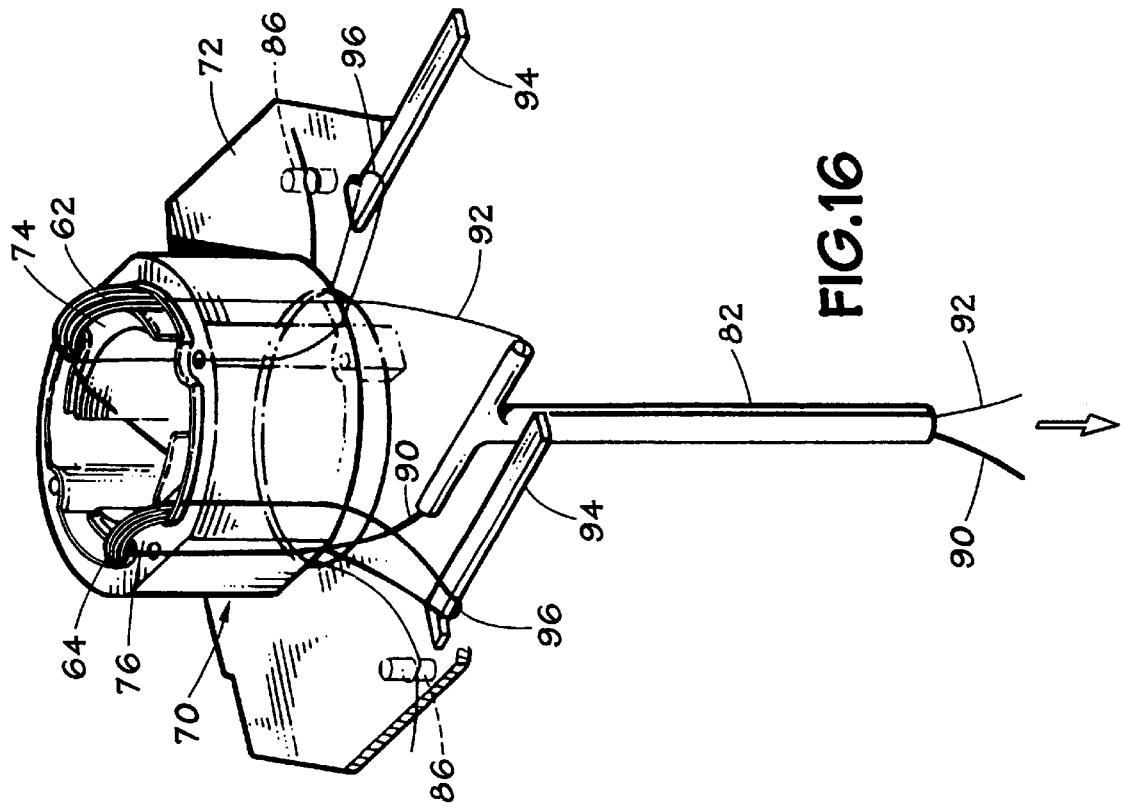
FIG. 16 shows the arrangement of FIG. 15 with the winding needle assembly lowered beneath the field core.
Figure 15:
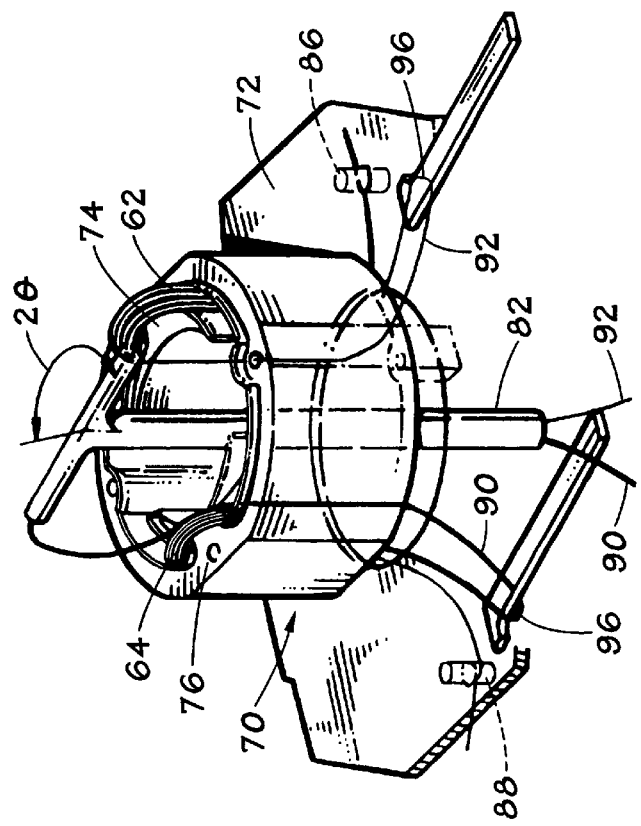
FIG. 15 shows the arrangement of FIG. 14 with the winding needle assembly rotated 2θ degrees clockwise.

Referring to FIG. 15, the winding needle assembly 82 is rotated 2θ degrees clockwise (i.e., in the opposite direction as shown in FIG. 8) and is moved downward as in FIG. 9 (see FIG. 16).

Figure 17:
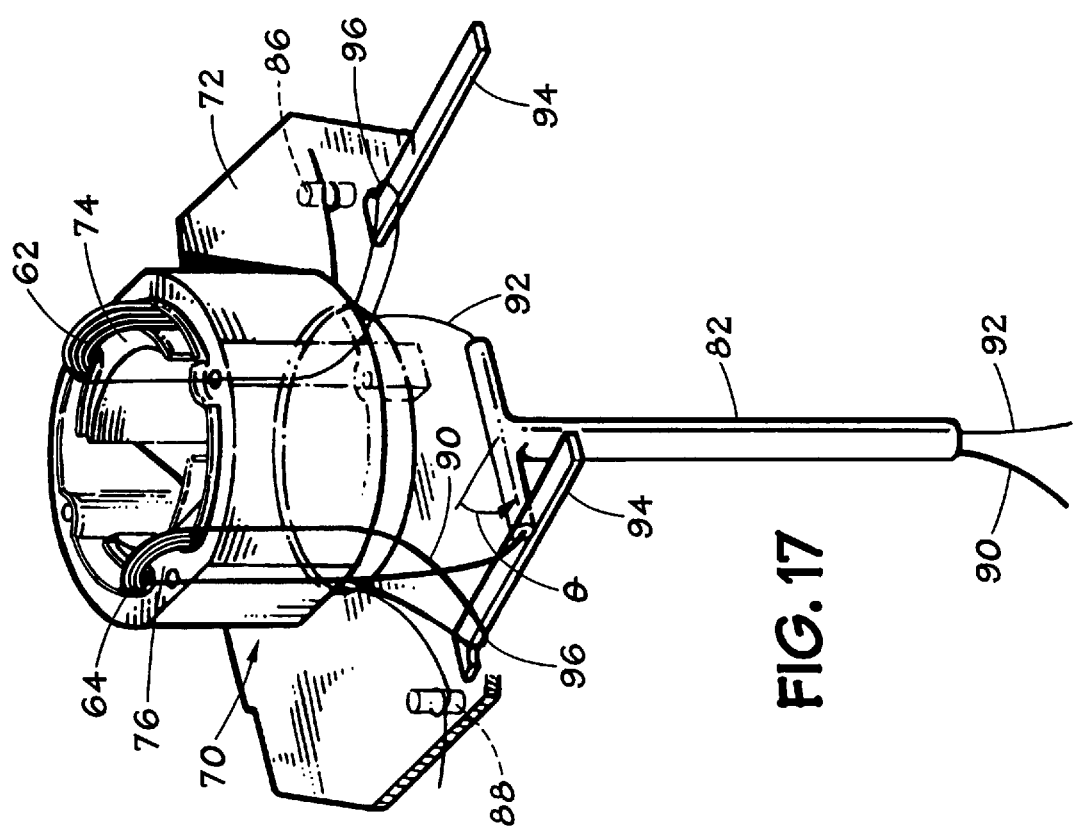
FIG. 17 shows the arrangement of FIG. 16 with the winding needle assembly rotated θ degrees counterclockwise.

Referring to FIG. 17, the winding needle assembly 82 is rotated θ degrees counterclockwise to return the winding needle assembly 82 to the neutral position. At this point in the winding process, one turn of field winding wire 90 is wound around the second field pole 76 (which was previously wound with brake winding wire 92 to form brake winding 64 in FIGS. 6 through 11) and one turn of brake winding wire 92 is wound around the first field pole 74 (previously wound with field winding wire 90 to form field winding 62).

Figure 18:
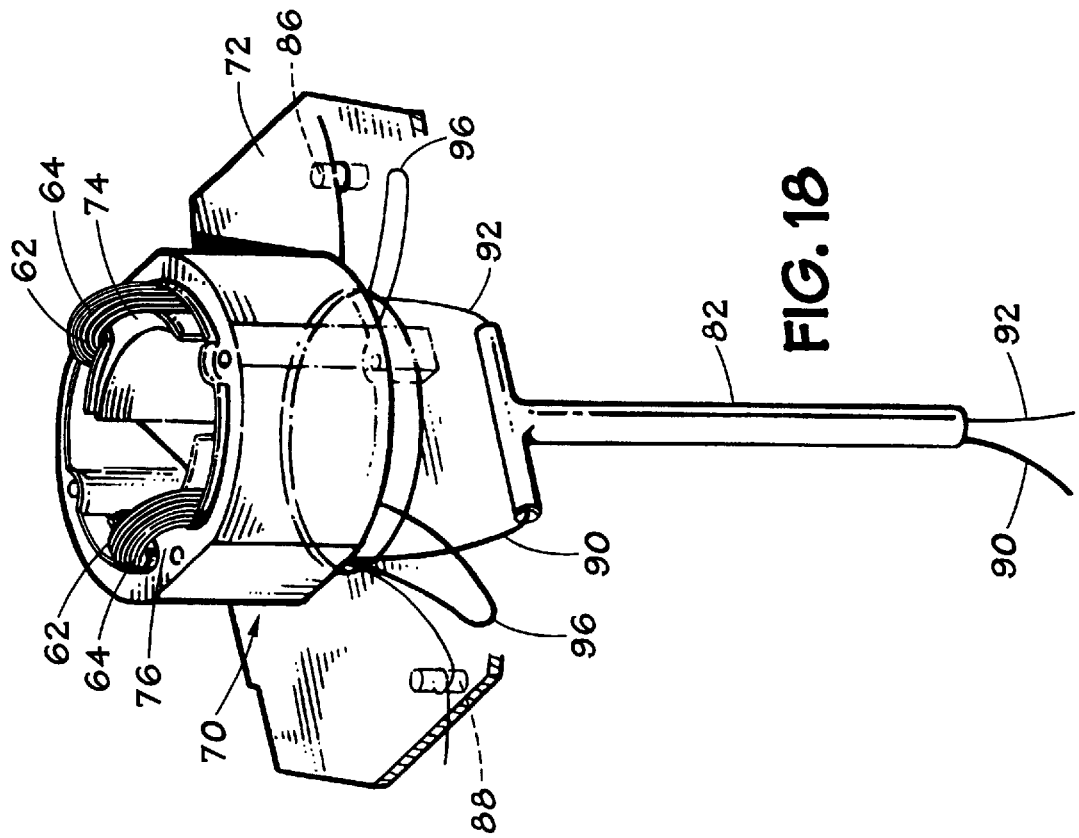
FIG. 18 shows the arrangement after several iterations of the steps shown in FIGS. 14 through 17, and shows a field winding wound over the brake winding on the second field pole, and a brake winding wound over the field winding on the first field pole.

Referring to FIG. 18, the winding needle assembly 82 repeats the winding steps as described in FIGS. 14 through 17 several times, creating a field winding 62 on the second field pole 76 and a brake winding 64 on the first field pole 74.

Referring to FIG. 19A, the wound field core 70 is removed from the winding machine, and the field winding wire 90 and brake winding wire 92 are detached from their respective wire supports 86 and 88 and are cut from their respective wire spools to create two leads on the ends of both wires. In subsequent operations, the wire leads will be attached to insulated leads which connect to the switch 37, brush 27 and the line cord as shown in FIG. 2, and the two loops 96 will be moved into the spaces between the poles 74 and 76 and secured.

Through the use of this winding process, both field poles now are encircled by a field winding 62 and a brake winding 64, with the field winding 62 wound over the brake winding 64 on the second field pole 76 (FIG. 19B) and the brake winding 64 wound over the field winding 62 on the first field pole 74 (FIG. 19C). In addition, the two field windings 62 and the two brake windings 64 are wired in series without the use of crossover connections. Furthermore, both field windings 64 are wound in the same direction (i.e. counterclockwise when viewed from perspective C) and both brake windings 62 are wound in the same direction (i.e. clockwise). This is shown diagrammatically in FIG. 19D. In this way electric current flowing through the two field windings 62 creates complimentary (i.e., additive) magnetic fields in the two poles to urge the maximum amount of flux through the armature (not shown) which rotates between the poles 74 and 76 during operation. Similarly, electric current flowing through the two brake windings 64 creates complimentary magnetic fields in the two poles 74 and 76 to urge the maximum amount of flux through the armature during braking.

The inventive winding procedure and field assembly produced thereby can be used to build, for example, an improved motor for a miter saw. For example, to construct a alternating current (AC) motor drawing 15 Amp rms (root mean square) current (i.e., a 15 Amp rated motor) and capable of turning the armature at 22,000 to 23,000 rpm (revolutions per minute), 56 turns of field winding 62 and brake winding 64 can be wound around each field pole 74 and 76 using 16-gauge insulated copper wire for the field winding wire 90 and smaller diameter 22-gauge insulated copper wire for the brake winding wire 92. Using these parameters, suitable motor operation and braking characteristics have been shown. Similarly, for a 12 Amp motor, 60 turns of field winding 62 and brake winding 64, using 17-gauge insulated copper wire for the field winding wire 90 and smaller diameter 23-gauge insulated copper wire for the brake winding wire 92 have shown suitable characteristics.

As those of ordinary skill in the art will appreciate, the present invention is adaptable to various modifications and alternate forms. For example, while use of the invention is illustrated above using a universal motor with two poles, the same concepts could be used for universal motors containing four poles (i.e., spaced at 90 degrees within the field core) or more. Also, the winding needle assembly rotations as disclosed could be reversed, resulting in windings which are wound in the opposite direction, to reverse motor rotation. Moreover, the field core could be indexed (FIG. 13) in the opposite direction without effect.

The method as disclosed might be altered in other ways. While it is believed advantageous to use continuous wires 90 and 92 to form the field windings and the brake windings on each of the two field poles, separate wires could be used for winding each of the four windings, while still placing a brake winding over the field winding on one pole, and placing a field winding over the brake winding on the other pole. This could be accomplished by cutting the winding wires 90 and 92 after the first field and brake windings are formed (i.e., instead of performing the lead pulling operation shown in FIG. 12), indexing the field core (FIG. 13), reattaching the winding wires 90 and 92 to their respective wire supports 86 and 88, and continuing the winding operation as disclosed above (FIGS. 14–19D). This could also be accomplished by winding the first field and brake windings on one machine and winding the second field and brake windings on a second machine. Of course, while such a winding scheme may have advantages in a particular application, the leads of the two field windings and the two brake windings would need to be connected by crossover connections.

Also, while it is usually expected that the diameter of the brake winding wire will be smaller than the diameter of the field winding wire to provide suitable braking characteristics, it may be suitable for a given application to provide a brake winding wire whose diameter is larger than the field winding wire.

It should be understood that it is not intended for the invention be limited to the particular forms disclosed. Further, it is intended that the invention cover all modifications, equivalents and alternatives falling within the spirit and scope of the invention defined by the appended claims.

What is claimed is:

1. A field assembly for a universal motor, comprising:
   (a) a field core;
   (b) a plurality of field poles connected to the field core, including at least a first field pole and a second field pole;
   (c) a first winding wound around the first field pole, the first winding comprising a first wire;
   (d) a second winding wound over the first winding on the first field pole, the second winding comprising a second wire;
   (e) a third winding wound around the second field pole, the third winding comprising the second wire; and
   (f) a fourth winding wound over the third winding on the second field pole, the fourth winding comprising the first wire.

2. The field assembly of claim 1, wherein the first winding and the second winding contain the same number of turns, and wherein the third winding and the fourth winding contain the same number of turns.

3. The field assembly of claim 1, wherein the first wire has a first diameter, the second wire has a second diameter, and the first diameter is smaller than the second diameter.

4. The field assembly of claim 1, wherein the number of field poles is two.

5. The field assembly of claim 1, wherein the first field pole and the second field pole appear on opposite sides of the field core.

6. The field assembly of claim 1, further comprising an armature disposed between the first field pole and the second field pole.

7. A field assembly for a universal motor, comprising:
   (a) a field core;
   (b) a plurality of field poles connected to the field core, including at least a first field pole and a second field pole;
   (c) a first brake winding wound around the first field pole, the first brake winding comprising a first brake winding wire;
   (d) a first field winding wound over the first brake winding on the first field pole, the first field winding comprising a first field winding wire;
   (e) a second field winding wound around the second field pole, the second field winding comprising a second field winding wire; and
   (f) a second brake winding wound over the second field winding on the second field pole, the second brake winding comprising a second brake winding wire.

8. The field assembly of claim 7, wherein the first field winding and the first brake winding contain the same number of turns, and wherein the second field winding and the second brake winding contain the same number of turns.

9. The field assembly of claim 7, wherein the number of field poles is two.

10. The field assembly of claim 7, wherein the first field pole and the second field pole appear on opposite sides of the field core.

11. The field assembly of claim 7, wherein the first field winding wire and the second field winding wire constitute one continuous field winding wire, and the first brake winding wire and the second brake winding wire constitute one continuous brake winding wire.

12. The field assembly of claim 11, wherein the continuous field winding wire has a first diameter, the continuous brake winding wire has a second diameter, and the first diameter is different than the second diameter.

13. The field assembly of claim 12, wherein the first diameter is bigger than the second diameter.

14. The field assembly of claim 7, further comprising an armature disposed between the first field pole and the second field pole.

15. A field assembly for a universal motor, comprising:
   (a) a field core;
   (b) a plurality of field poles connected to the field core;
   (c) brake winding wire of a first diameter wound around at least two of the plurality of field poles to create N turns around the at least two field poles, where N is a positive integer greater than or equal to 1; and
   (d) field winding wire of a second diameter wound around at least two of the plurality of field poles to create N turns around the same at least two field poles over which the brake winding wire are wound.

16. The field assembly of claim 15, wherein the first diameter is different than the second diameter.

17. The field assembly of claim 16, wherein the first diameter is smaller than the second diameter.

18. The field assembly of claim 15, wherein the number of field poles is two.

19. The field assembly of claim 15, wherein the at least two field poles appear on opposite sides of the field core.

20. The field assembly of claim 15, wherein the brake winding wire wound around the at least two field poles constitutes one continuous wire, and the field winding wire wound around the at least two field poles constitutes one continuous wire.

21. The field assembly of claim 15, further comprising an armature disposed between the plurality of field poles.

22. A universal motor, comprising:
(a) a field core, the field core including at least a first field pole and a second field pole;
(b) an armature disposed between the first field pole and the second field pole;
(c) means for energizing the motor to enable the armature to turn between the first and second field poles; and
(d) means for braking the motor to stop the armature from turning between the first and second field poles,
wherein the means for energizing includes a first field winding and a second field winding, the means for braking includes a first brake winding and a second brake winding, and wherein the first brake winding is wound around the first field pole, the first field winding is wound around the second field pole, the second brake winding is wound over the first field winding, and the second field winding is wound over the first brake winding.

* * * * *